Patented Dec. 1, 1931

1,834,050

UNITED STATES PATENT OFFICE

JOSEPH G. DAVIDSON, OF YONKERS, NEW YORK, ASSIGNOR TO CARBIDE & CARBON CHEMICALS CORPORATION, A CORPORATION OF NEW YORK

LACQUER AND VARNISH THINNER

No Drawing.   Application filed January 27, 1928.   Serial No. 250,083.

My invention relates to lacquers, varnishes, enamels, and surface coatings in general and particularly to a new and advantageous solvent, thinner, or diluent therefor.

In the manufacture of lacquers, varnishes, enamels and such like surface-protecting, or covering preparations, the solvent or thinner is a vital part of the preparation, since it serves to liquefy the substance which is to form the body of the coat. Many substances have been proposed and used for this purpose, but difficulties have been encountered in producing satisfactory preparations, particularly in the case of lacquers having a cellulosic base, such as the nitro-cellulose lacquers. It has been customary in the prior art to prepare a solution of the nitro-cellulose in some appropriate solvent, which is then desirably diluted to a suitable flowable viscosity by a thinner or diluent. This has been found necessary because of the fact that true solvents for nitro-cellulose such as the well-known ether-alcohol mixture, or the more recently produced solvents are decidedly expensive and frequently are non-solvents or poor solvents for the resins and oils which ordinarily are a part of the lacquer or surface coating. As resin solvents it has been customary to use such substances as benzene, toluene or xylene. None of these hydro-carbons are true solvents for nitro-cellulose, but they frequently act as latent or additive solvents, and substantial proportions of all three may be added to a nitro-cellulose solution as diluents, without precipitation of the nitro-cellulose, although such precipitation will occur if an excess is added. These substances are not, however, very satisfactory. Benzene as such is undesirable because of its high toxicity and low boiling point, causing an unduly rapid evaporation of the diluent, which prevents satisfactory flowing of the coat of lacquer and results in the production of a rough or grained surface, instead of the desired smooth surface. Similar remarks apply to toluene, although it is distinctly less toxic. In addition toluene is a much more expensive substance, of which the supply is much smaller. The xylenes are still higher in price and available only in still smaller quantity, and accordingly are substantially impracticable as lacquer thinners although the boiling point is much more suitable and the toxicity much less than that of benzene. Other less common substances may be used for lacquer thinners, but are unsatisfactory for various reasons usually because of the high cost, or unsuitable boiling point.

My invention provides a latent solvent, thinner or diluent for a lacquer and a lacquer composition, which avoids the disadvantages encountered in the use of the previously available substances. I find that the alkyl benzenes produced in the usual way may be mixed with appropriate lacquer substances for the production of a highly advantageous lacquer or surface coating preparation, and that when so prepared, the resulting lacquer is substantially free from toxic effect, is inexpensive to produce, dries with sufficient speed for satisfactory ease of application, and dries with sufficient slowness to produce a smooth surface free from grain and imperfections.

Other objects and details of my invention will be apparent from the following description.

In the production of my lacquer preparation, I may produce a satisfactory mixture by dissolving 25 grams of nitro-cotton in 75 grams of a solvent such as the mono-ethyl ether of ethylene glycol, and after solution adding a sufficient quantity of an alkyl benzene as produced by the above-mentioned process to bring the preparation to a suitable consistency. I find that it is possible to add an amount of mono ethyl benzene equal to six times the volume of the nitro-cotton and solvent before precipitation of the nitro-cotton occurs. Such a mixture produces a lacquer which will flow from the brush into an extremely thin film, and is a more fluid preparation than is required for most customary lacquer uses. Accordingly a smaller proportion of the ethyl benzene as thinner may be added to produce a lacquer having the desired characteristics of body and flow. It is of course possible to produce a lacquer of the desired viscosity and the desired percentage composition of non-volatile matter by reducing the amount of solvent to the minimum which will keep the gum or covering solid in solution in the presence of a maximum proportion of thinner.

Monoethyl benzene has a boiling point of 134° C. which is a highly advantageous property for a latent solvent, diluent or thinner, since it is a suitable boiling point to obtain satisfactory rapid drying of the lacquer, and sufficiently slow drying to permit of a satisfactory flow smoothing of the surface to avoid surface imperfections such as "orange peel" marks "brush marks", etc. In addition to this the boiling point is exactly the same as ethylene glycol mono-ethyl ether, a preferred nitrocellulose solvent and not very different from that of butyl acetate, another widely used nitrocellulose solvent. This property permits both the nitrocellulose solvent and the resin solvent or diluent to evaporate at about the same rate, thus keeping the relative proportions of both solvents substantially constant, all of which is conductive to the formation of excellent films and avoidance of the separation of either nitrocotton or resin during the drying of the film with the consequent development of "cotton blush" or "gum blush."

I further find that it is not necessary that mono ethyl benzene be used in the pure form as thinner to produce a highly advantageous lacquer. Other of the higher homologues of mono ethyl benzene are likewise usable, and the slightly higher boiling points thereof are not detrimental, and may in some instances be highly advantageous. I find that di-ethyl benzene as such may be added to a solution of nitro-cotton in an appropriate solvent in exactly the same manner as the mono ethyl benzene may be added, for the production of an equally satisfactory lacquer preparation, which is slightly slower drying because of a slightly higher boiling point and lower volatility of the di-ethyl benzene as compared to that with the mono-ethyl benzene. The slightly different characteristics of the di-ethyl benzene results in precipitation of the dissolved nitro-cellulose after the addition of slightly less than six volumes, so that very slightly less of the di-ethyl benzene may be added than with the mono-ethyl benzene. Similarly the still higher homologues such as the hexa-ethyl benzene, and the butyl-, propyl- and pentyl- benzenes are usable for the same purposes, and show a similar gradation of characteristics, the higher homologues showing progressively smaller diluent properties, and making progressively slower drying lacquers. The above-mentioned alkyl benzenes are collectively referred to herein as "alkyl benzenes having at least one plural-carbon-atom side chain" to distinguish them from alkyl benzenes in which the substituted groups are exclusively methyl groups.

The required preparation may be produced by dissolving the gum or body substance in a solvent, and then diluting the solution with latent solvent as above described, or, alternatively, the true solvent and the latent solvent may first be mixed, and the covering solid may then be dissolved in the mixture. It may be noted that from 15 to 16% of the mono-ethyl ether of ethylene glycol added to the alkyl benzenes produces a suitable solvent for the nitro-cellulose substances. On the other hand from 25% to 30% of the mono-ethyl ether of ethylene glycol is required in mixture with gasoline, to produce a solvent for the nitro-cellulose. This indicates that the latent solvent action of the alkyl benzenes is much higher than that of gasoline.

I further find that the mixture of alkyl benzenes produced by the usual method of preparation is directly usable in place of a single pure ethyl benzene, and produces a lacquer having for some purposes even more desirable properties than that produced by a preparation made from a single pure ethyl benzene. The range of boiling points of the various constituents of the mixture appears to be highly advantageous in the production of a smooth drying lacquer which dries hard at a desirably rapid rate, without drying so rapidly as to produce a roughened or unsatisfactory surface.

The advantages of the diluents of my invention may be summarized by saying that the mono ethyl benzene or the mixed alkyl benzenes have a dilution ratio of approximately 6 as compared with toluene which has a dilution ratio of only 5 and xylene, having a ratio of only 2.6. Mono ethyl benzene or the mixed alkyl benzenes thus have the excellent boiling range of xylene and the excellent dilution ratio of toluene. There is no pure material obtainable from coal tar as ordinarily marketed which has this desirable boiling range and dilution ratio.

I have described the invention as applied to the production of a nitro-cellulose lacquer. It is, however, equally applicable to liquid surface coatings formed from other substances, and similar remarks apply to the lacquer so produced. Some varnish gums and some synthetic resins such as polymerized vinyl acetate are directly soluble in the alkyl benzenes. Others may be dissolved by the customary solvents, and diluted to a suitable fluidity by the addition of alkyl benzenes in the same manner as previously described for the treatment of the nitro-cotton lacquers. All such solutions are embraced in this invention.

The various surface protecting preparations may be divided into three different groups, or classes, such as the cellulose ester coatings, varnish coatings and synthetic coatings. The first type may consist of cellulose preparations such as the nitro-cellulose or acetate of cellulose dissolved in a volatile solvent, with or without a latent diluent, and flexibilizing substances. The varnish may consist of a natural resin dissolved in a vegetable or drying oil, with an appropriate diluent or thinner. The synthetic resins such as polymerized vinyl acetate, polymerized styrol, phthalic anhydride-glycerine resin, etc., may likewise be dissolved in a volatile thinner or may be dissolved in a drying oil, in either case with or without the addition of a diluent or thinner. In any of these preparations the alkyl benzene substances of my invention are particularly adapted to utilization. The latent solvent action is particularly advantageous with the cellulose preparations. It is likewise particularly advantageous with the varnishes, because of its rapid evaporation and its high solvent effect, both on the natural resins and on the drying oils. It is likewise advantageous in connection with other synthetic resins, because of its solvent properties.

It is likewise readily possible to incorporate in the lacquers suitable color producing substances, in the same way that coloring substances are introduced in the lacquers now in use.

By my invention I have thus produced a new lacquer composition having highly desirable flowing and drying properties.

I claim as my invention:

1. A liquid coating composition containing a cellulose ester, monoethyl benzene, and ethylene glycol mono-ethyl ether.

2. A liquid coating composition containing nitro-cellulose, a varnish gum or resin, monoethyl benzene, and ethylene glycol monoethyl ether.

3. A liquid coating composition containing a cellulose ester; a member of the group of solvents consisting of ethylene glycol monoethyl ether and butyl acetate; and an ethyl benzene having approximately the same boiling point as said solvent.

In testimony whereof, I affix my signature.

JOSEPH G. DAVIDSON.